United States Patent Office 2,788,277
Patented Apr. 9, 1957

2,788,277

CEREAL

Louis J. Huber, Minneapolis, Minn., assignor to General Mills, Inc., a corporation of Delaware No Drawing. Application March 30, 1953,
Serial No. 345,705

7 Claims. (Cl. 99—83)

The present invention relates to a ready-to-eat breakfast cereal composed of a base cereal material, having a sugar coating and having distinct particles of cereal material deposited on the sugar coating.

The product of the present invention may be composed of a wide variety of cereal bases, particularly puffed cereal bases. To this cereal base is applied a conventional type of candy syrup coating, and finally the product is coated with any of a variety of discrete cereal particles of appreciable size as distinguished from a cereal dust. The product thus obtained is unique and has numerous advantages. The invention makes possible numerous cereal products of attractive appearance. By selecting the proper combination of cereal materials in the base cereal and in the coating cereal, and by employing suitable colors in either of the cereals or in the sugar coating, it is possible to produce variegated cereal products of attractive appearance. Thus, the base cereal may be very light in color and the candy coating applied to this cereal may, likewise, be relatively light, and to the exterior of the candy coating there may be applied a cereal material of a naturally contrasting color as compared with the base material, or a cereal material which has been converted to a contrasting color by the inclusion of dyes or pigments. Similarly, the pigments or dyes may be applied to the base material and a light color, or contrasting color, cereal coating may be employed.

The base material and the coating material may be of the same origin, or they may be different. The eating qualities of the cereal will depend upon the particular combination of cereals employed, and the physical condition of these cereals. It is particularly desirable to employ a different cereal for the coating as compared with the base, inasmuch as this alters the eating characteristics and also contributes a variety to the flavor.

The base material may be a puffed grain product, such as puffed corn, wheat, rice, or oats. Thus, the essential kernel structure of the original grain may be preserved in these products. Again, the invention is applicable to puffed cereal base materials which are derived from cooked doughs of corn, oats, rye, wheat, rice and the like, such as are disclosed in Collatz Patent Nos. 2,162,376 and 2,388,904. These products derived from cooked doughs lend themselves to a greater variety in that various coloring and flavoring materials may be included in the doughs in order to alter the flavor and color of the product more readily than is the case with the distinct grain kernels.

The sugar coating which is applied may be any of the usual sugar coatings employed for coating ready-to-eat breakfast cereals. Frequently these are composed of sucrose, corn sugar or syrup, or invert sugar, together with various modifying and flavoring materials. Coloring ingredients may be included in the sugar coating if desired. For the cereal coating applied to the sugar coating, a variety of materials may be employed. These may be any of the cereal flakes, such as corn flakes, wheat flakes, bran flakes, and the like. These flakes are preferably employed in a form which is much smaller than the flakes which are commonly used as such for ready-to-eat breakfast cereal purposes. The size of the flakes are such that a substantial number of them may be made to adhere to a single piece of the cereal base material. Thus, from 10–20 of these cereal flakes may adhere to a single cereal base piece. Other materials which may be used include oatmeal flakes, granular oatmeal, granules of puffed cereals. For example, all of the puffed cereals referred to above, whether made from whole kernels or from cooked doughs, may be broken and granules of approximately the same size as the flakes referred to above may be used to coat the cereal.

The products obtained are extremely attractive both to adults and children. The combination of flavors and textures which may be obtained make the products appealing. Likewise, the possibility of variations in color, either through the selection of contrasting cereal materials or by means of the employment of contrasting colors, is a distinct advantage.

*Example 1*

A puffed oat cereal was prepared from a dough composed of oat flour and other cereal starches as described in Collatz Patent No. 2,162,376. The dough was extruded into pellets, which were subsequently dried and puffed at a typical puffing moisture. A syrup was prepared from corn syrup, sucrose, salt and water, which was then heated to from 250–300° F. The puffed oat cereal, in a preheated condition, was then mixed with the hot syrup, and the mixture agitated until the syrup was evenly distributed over the surface of the cereal. Thereafter, granular or finely flaked oatmeal was introduced into the mixture and the cereal particles coated with this flaked material. The entire mass was then allowed to cool. The product obtained had a salt and pepper appearance of many adhering flakes which show white against an amber background, and allow each cereal piece to remain separate and distinct. The sugar coating was glossy and added to the attractiveness of the product.

*Example 2*

The oat cereal base of Example 1 was coated with a fondant type white sugar coating by heating an aqueous sucrose solution to 240–250° F. and then applying the syrup to the preheated puffed oat cereal. The mixture was agitated for from 30–60 seconds, and thereafter toasted whole wheat flakes were mixed in with the cereal to thoroughly coat the cereal with the flakes. The product thus obtained was composed of brown, mottled cereal flakes adhering to the dull white sugar coating on the puffed oat cereal. The product was non-hygroscopic and could be exposed to such humidities that the puffed cereal base became soggy or spongy without showing any appreciable tackiness or tendency to block. Samples were raised in moisture from 2–3% up to 14% with practically no serious effect upon blocking or tackiness.

*Example 3*

The puffed oat cereal of Example 1 was coated with a bright, shiny sugar coating as described in Example 1. Whole wheat flakes which were dyed to a bright orange-red color were then applied to the sugar coated oat cereal while the coating was still sticky such that the flakes adhered to the product. The product obtained was composed of a light colored oat cereal base having a shiny sugar coating with the bright colored wheat flakes superimposed on the shiny coating.

*Example 4*

A puffed corn cereal base was prepared by cooking a dough composed principally of corn meal and containing, in addition, some minor quantities of other cereal starches as disclosed in Collatz Patent 2,388,904. The cooked dough was extruded in the form of pellets. The pellets were dried partially, and then flaked. Thereafter, the flaked pellets were puffed in a puffing gun to provide the corn cereal base. To this base was applied a syrup composed of sucrose, molasses, salt and water which had been cooked to 280° F. The preheated corn cereal base was stirred rapidly and the syrup coating applied. While the syrup coating was still tacky, wheat flake particles were then applied and the mixture cooled. The product obtained was composed of a fairly light colored cereal base to which were adhered the dark brown colored wheat flakes.

*Example 5*

The puffed oat cereal base of Example 1 was employed. A sugar syrup was prepared and cooked to 300° F. This was then poured over the puffed oat cereal which had been preheated. When the syrup had been uniformly distributed over the surface of the oat cereal base, granules obtained by grinding a portion of the oat cereal base were applied to the oat cereal pieces to provide a coating of essentially the same color as the base stock, but of an entirely novel appearance and eating quality.

In general, it has been found desirable to apply the cereal granules or flakes at the end of the sugar coating operation. If they are introduced earlier, the flakes and granules absorb an excess amount of the syrup and the sugar coating on the surface of the base stock does not appear as attractive. Considerable variation is possible in the size of the flakes and granules, but generally they should be of a size in which they are readily discernible individually and should not be finely divided as a dust or flour. Generally they should be larger than the particles which will pass through a 35-mesh standard screen. These flakes and granules adhere tenaciously to sugar coating on the base cereal stock and do not readily fall off when the cereal is placed in milk, ready for eating. The flakes and granules remain on the cereal during the period of time normally required for the consumption of the product.

I claim as my invention:

1. A cereal product comprising a puffed cereal base piece having a sugar coating thereon and a flaked cereal coating adhered to the sugar coating, the flaked cereal coating being composed of a substantial number of cereal flakes which are relatively small as compared to the size of the cereal base piece.

2. Product according to claim 1 in which the flaked cereal coating is derived from a cereal grain different from the cereal base.

3. Product according to claim 1 in which the flaked cereal coating is of a contrasting color to the cereal base.

4. A cereal product comprising a puffed oat cereal base piece having a sugar coating thereon and a flaked cereal coating adhered to the sugar coating, the flaked cereal coating being composed of a substantial number of cereal flakes which are relatively small as compared to the size of the cereal base piece.

5. Product according to claim 4 in which the oat cereal base piece is derived from a cooked dough of oat flour.

6. Product according to claim 4 in which the cereal flakes applied to the cereal base piece are derived from wheat.

7. A cereal product comprising a puffed corn cereal base piece having a sugar coating thereon and a flaked cereal coating adhered to the sugar coating, the flaked cereal coating being composed of a substantial number of cereal flakes which are relatively small as compared to the size of the cereal base piece.

References Cited in the file of this patent

UNITED STATES PATENTS

| | | |
|---|---|---|
| 1,462,883 | Cloud | July 24, 1923 |
| 2,196,395 | Kellogg | Apr. 9, 1940 |
| 2,428,665 | Harrel et al. | Oct. 7, 1947 |
| 2,607,691 | Bettman | Aug. 19, 1952 |

OTHER REFERENCES

"Encyclopedic Cookbook," by Berolzheimer, Culinary Arts Institute, Chicago, 1948, page 754.

Meta Given's "Modern Encyclopedia of Cooking," volume I, J. G. Ferguson and Associates, Chicago, 1949, pages 518 and 584.